United States Patent
Llne et al.

(10) Patent No.: US 9,718,387 B2
(45) Date of Patent: Aug. 1, 2017

(54) SEAT CUSHION MODULE FOR A VEHICLE SEATING ASSEMBLY

(71) Applicant: Ford Global Technologies, LLC, Dearborn, MI (US)

(72) Inventors: Johnathan Andrew Llne, Northville, MI (US); Marc Silva Kondrad, Macomb, MI (US); Brett E. Ronzi, Highland, MI (US); Christian J. Hosbach, Taylor, MI (US); Rodney Charles Brinker, Eastpointe, MI (US); Keith Allen Godin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/816,425

(22) Filed: Aug. 3, 2015

(65) Prior Publication Data
US 2017/0036577 A1    Feb. 9, 2017

(51) Int. Cl.
*A47C 7/00*    (2006.01)
*B60N 2/68*    (2006.01)
(Continued)

(52) U.S. Cl.
CPC ............... *B60N 2/68* (2013.01); *B60N 2/48* (2013.01); *B60N 2/50* (2013.01); *B60N 2/58* (2013.01);
(Continued)

(58) Field of Classification Search
CPC .......... B60N 2/427; B60N 2/68; B60N 2/643; B60N 2/667; B60N 2/64; B60N 2/7035; B60N 2/6671; B60N 2/682
(Continued)

(56) References Cited

U.S. PATENT DOCUMENTS

| 2,958,369 A | 11/1960 | Pitts et al. |
| 3,403,938 A | 10/1968 | Cramer et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Chi Q Nguyen
(74) *Attorney, Agent, or Firm* — Vichit Chea; Price Heneveld LLP

(57) ABSTRACT

A vehicle seating assembly includes a seatback frame and a seat frame defining a seating frame. A plurality of distinct assembly modules are configured for attachment with the seating frame. The plurality of distinct assembly modules include a back cushion module, a hard back module, a headrest module, and a seat cushion module. The seat cushion module includes a composite cushion pan having a rearward support defining an intermediate open area. A forward support is pivotally coupled to the rearward support. A suspension assembly is disposed in the intermediate open area. A cushion extends over the composite cushion pan. A coverstock covers the cushion.

17 Claims, 15 Drawing Sheets

(51) Int. Cl.
  *B60N 2/50* (2006.01)
  *B60N 2/48* (2006.01)
  *B60N 2/64* (2006.01)
  *B60N 2/58* (2006.01)
  *B60N 2/427* (2006.01)
  *B60N 2/66* (2006.01)
  *B60N 2/70* (2006.01)

(52) U.S. Cl.
  CPC .............. *B60N 2/64* (2013.01); *B60N 2/686* (2013.01); *B60N 2/427* (2013.01); *B60N 2/643* (2013.01); *B60N 2/667* (2015.04); *B60N 2/6671* (2015.04); *B60N 2/682* (2013.01); *B60N 2/7035* (2013.01)

(58) Field of Classification Search
  USPC .............. 297/452.18, 452.21, 216.1, 411.44, 297/440.15, 452.16, 452.38, 452.55, 297/452.58, 452.48
  See application file for complete search history.

(56) References Cited

U.S. PATENT DOCUMENTS

| | | |
|---|---|---|
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,673,215 A * | 6/1987 | Yokoyama ............. B60N 2/165 248/429 |
| 4,720,141 A | 1/1988 | Sakamoto et al. |
| 4,850,644 A * | 7/1989 | Kazaoka ............. B60N 2/0715 297/325 |
| 4,915,447 A | 4/1990 | Shovar |
| 5,171,062 A | 12/1992 | Courtois |
| 5,174,526 A | 12/1992 | Kanigowski |
| 5,284,381 A * | 2/1994 | Aoki ........................ B60N 2/68 297/452.1 |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,027,171 A * | 2/2000 | Partington ........... B60N 2/0232 297/284.1 |
| 6,050,635 A | 4/2000 | Pajon et al. |
| 6,056,366 A | 5/2000 | Haynes et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |

(56) References Cited

U.S. PATENT DOCUMENTS

| | | | |
|---|---|---|---|
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,240,758 B2 | 8/2012 | Combest | |
| 8,342,607 B2 | 1/2013 | Hofmann et al. | |
| 9,365,142 B1 * | 6/2016 | Line | B60N 2/02 |
| 9,415,713 B2 * | 8/2016 | Line | B60N 2/643 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2006/0175880 A1 * | 8/2006 | Hiruta | B60N 2/42763 297/216.1 |
| 2007/0120401 A1 | 5/2007 | Minuth et al. | |
| 2007/0222270 A1 * | 9/2007 | Combest | B60N 2/4221 297/452.21 |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0072804 A1 * | 3/2010 | Stauske | B60N 2/5621 297/452.38 |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2012/0305734 A1 * | 12/2012 | Balin | B60N 2/072 248/430 |
| 2013/0076092 A1 | 3/2013 | Kulkarni et al. | |
| 2013/0320742 A1 | 12/2013 | Murolo et al. | |
| 2014/0203617 A1 * | 7/2014 | Line | B60N 2/4495 297/423.29 |
| 2014/0224041 A1 * | 8/2014 | Ozawa | B60N 2/002 73/862.381 |
| 2014/0300145 A1 | 10/2014 | Beroth et al. | |
| 2015/0001906 A1 * | 1/2015 | Line | B60N 2/4808 297/403 |
| 2015/0231993 A1 * | 8/2015 | Hoshi | B60N 2/1615 297/344.12 |
| 2015/0300785 A1 * | 10/2015 | Lamparter | F41H 7/046 297/216.17 |
| 2015/0352986 A1 * | 12/2015 | Fujita | B60N 2/68 297/216.1 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 2743124 A1 | 6/2014 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), accessed Aug. 2, 2015 (1 page).

* cited by examiner

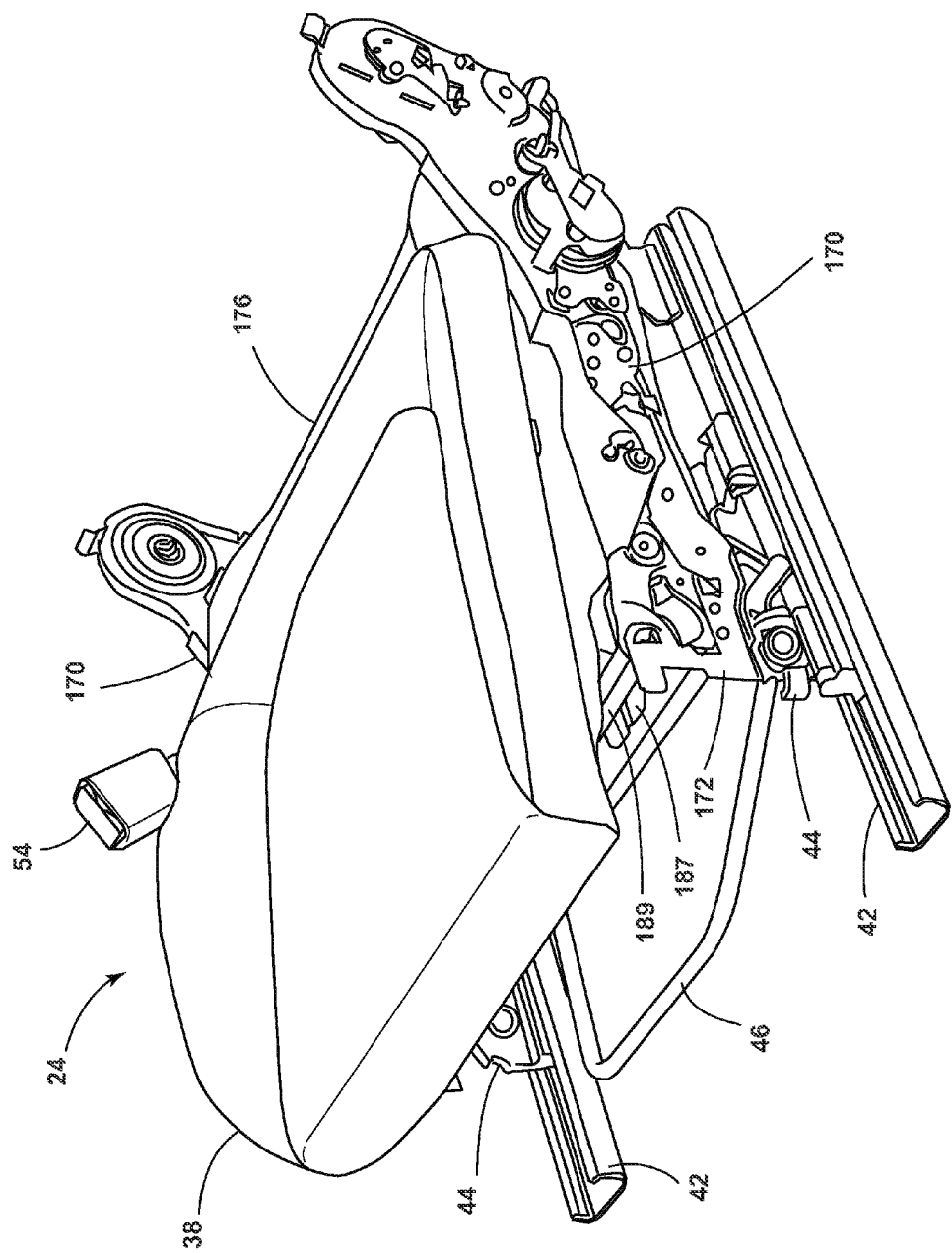

SEAT CUSHION MODULE FOR A VEHICLE SEATING ASSEMBLY

FIELD OF THE DISCLOSURE

The present disclosure generally relates to a vehicle seating assembly, and more particularly to a composite pan module for a vehicle seat.

BACKGROUND OF THE DISCLOSURE

Vehicle seating assemblies generally include seating structures configured to support the static and dynamic weight of a passenger during travel. The seating structures are often complex and assembled piece by piece at a manufacturing site.

SUMMARY OF THE DISCLOSURE

According to one aspect of the present disclosure, a vehicle seating assembly includes a seatback frame and a seat frame defining a seating frame. A plurality of distinct assembly modules are configured for attachment with the seating frame. The plurality of distinct assembly modules include a back cushion module, a hard back module, a headrest module, and a seat cushion module. The seat cushion module includes a composite cushion pan having a rearward support defining an intermediate open area. A forward support is pivotally coupled to the rearward support. A suspension assembly is disposed in the intermediate open area. A cushion extends over the composite cushion pan. A coverstock covers the cushion.

According to another aspect of the present disclosure, a vehicle seating assembly includes a seatback frame encompassed by a plurality of distinct assembly modules having a back cushion module, a hard back module, a headrest module, and a seat cushion module. The seat cushion module includes a composite cushion pan having a rearward support defining an intermediate open area. A forward support is pivotally coupled to the rearward support.

According to yet another aspect of the present disclosure, a method includes of making a vehicle seating assembly includes the step of constructing a seating assembly frame having a seatback frame. A plurality of distinct assembly modules are provided that include a seat cushion module. A composite cushion pan is coupled with the seat cushion module. The composite cushion pan is provided with a rearward support defining an intermediate open area. A forward support is provided that is pivotally coupled to the rearward support.

According to still another aspect of the present disclosure, a vehicle seating assembly includes a plurality of seating modules including a seat cushion module. The seat cushion module is configured for attachment with a seating frame of the vehicle seating assembly and is modular to accommodate easy installation, repair, and replacement.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 12 is a top perspective view of a seat cushion module of the present disclosure;

DETAILED DESCRIPTION OF THE EMBODIMENTS

Figure 1:
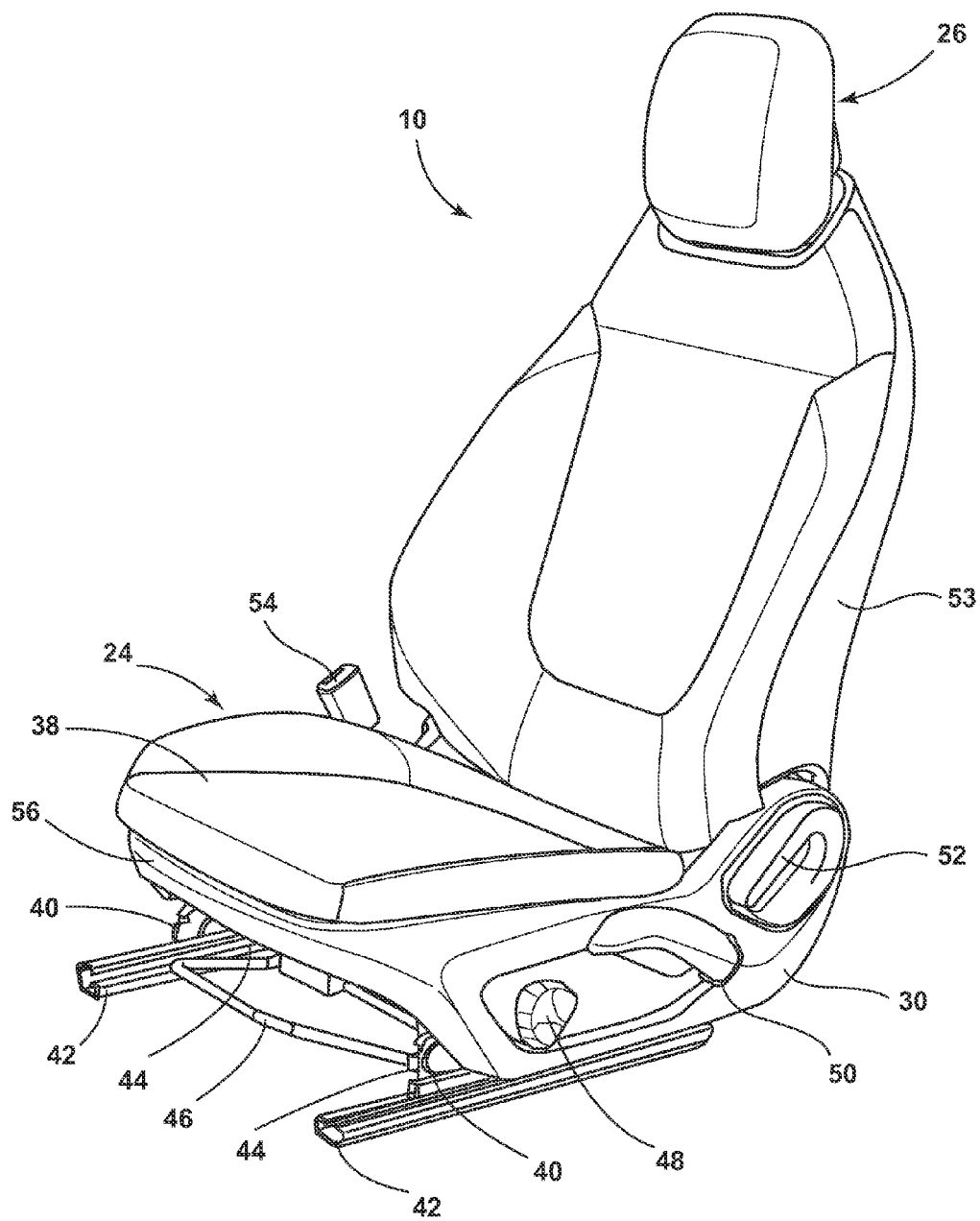
FIG. 1 is a front perspective view of one embodiment of a vehicle seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-16, reference numeral 10 generally designates a vehicle seating assembly that includes a seating frame 12 defining a seatback frame 14 and a seat frame 16. A plurality of distinct assembly modules 18 are configured for attachment with the seating frame 12. The plurality of distinct assembly modules 18 include a back cushion module 20, a hard back module 22, a seat cushion module 24, and a headrest module 26. The back cushion module 20 and the hard back module 22 are operably coupled together. The headrest module 26 extends over and operably couples the back cushion module 20 with the seat cushion module 24 to substantially encompass the seating frame 12. The seat cushion module 24 is positioned on the seat frame 16 in front of the seatback frame 14. Side trim pieces 30 are configured to extend over the seat frame 16 concealing side portions 34 of the seat cushion module 24.

Figure 2:
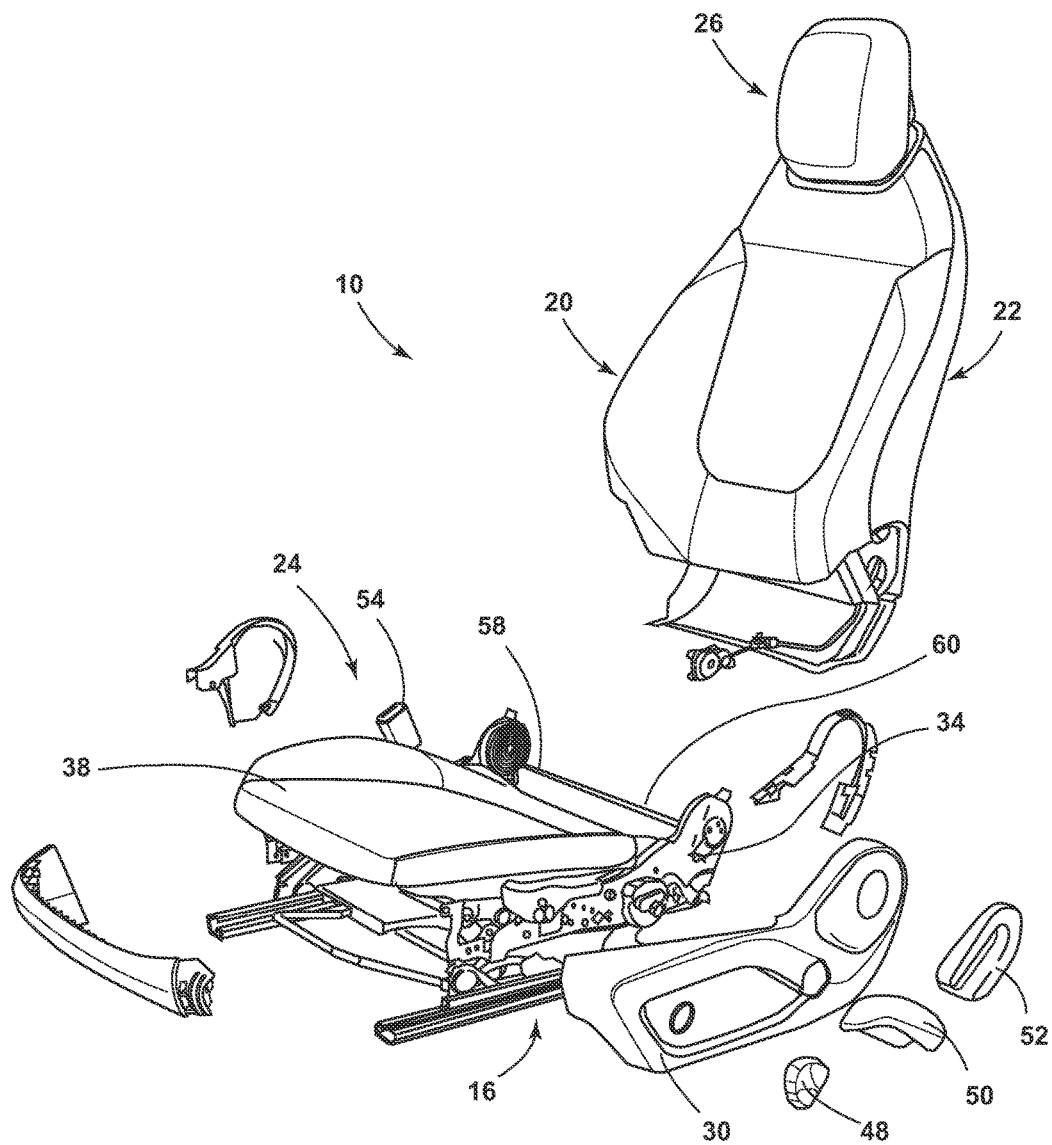
FIG. 2 is a front perspective partially exploded view of the vehicle seating assembly of FIG. 1.

With reference to FIGS. 1 and 2, the vehicle seating assembly 10 is configured for installation in a vehicle, such as a car, a truck, or a van. A seat base 38 of the vehicle seating assembly 10 is supported on a rail slide assembly 40 that allows for fore and aft movement of the vehicle seating assembly 10 relative to the vehicle. Rails 42 are secured with a floor of the vehicle, while slides 44 are operably coupled with the vehicle seating assembly 10. The slides 44 are in sliding engagement with the rails 42. The slides 44 can be adjusted and locked by a user using a forward slide control 46. In addition, a multitude of side controls, including a lumbar support control 48, a thigh support control 50, and a seatback pivot control 52 that allows for pivoting movement of a seatback 53 are provided proximate the seat cushion module 24, and allow for adjustment of the seatback 53 and the seat base 38 to accommodate passengers. A receiver 54 for a seatbelt assembly is disposed on the vehicle seating assembly 10 to secure a passenger during a collision event. In addition, a forward trim component 56 and the side trim pieces 30 are disposed about the seat base 38. The trim components 56 cover the seat frame 16 and structural components of the seat base 38 and the seat cushion module 24. As illustrated in FIG. 2, the seatback 53 is pivotal relative to the seat base 38 about a pivot rod (or torsion bar) 58 proximate a rear portion 60 of the seat base 38.

Figure 3:
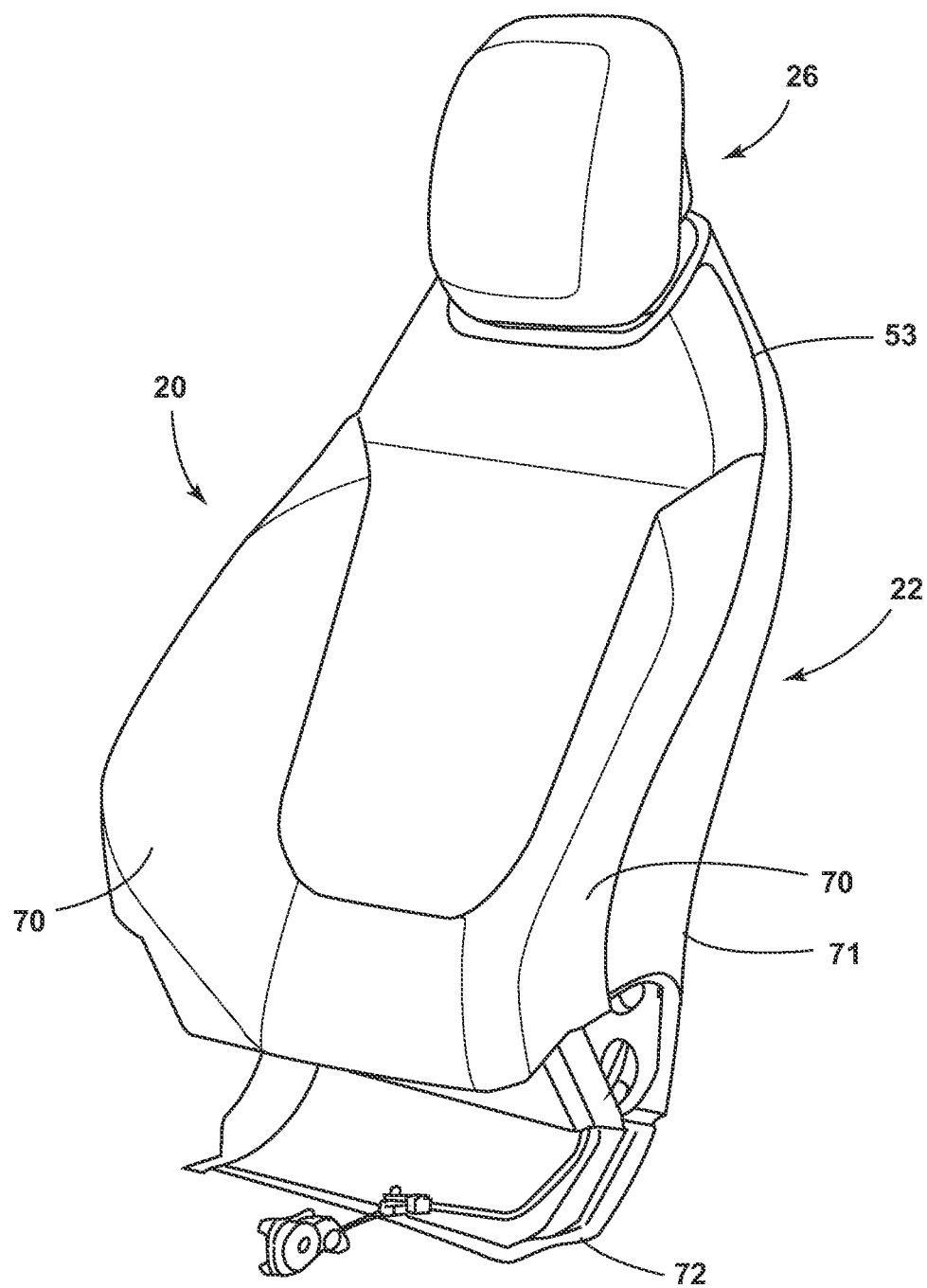
FIG. 3 is a front perspective view of one embodiment of a seatback of the present disclosure.
Figure 3A:
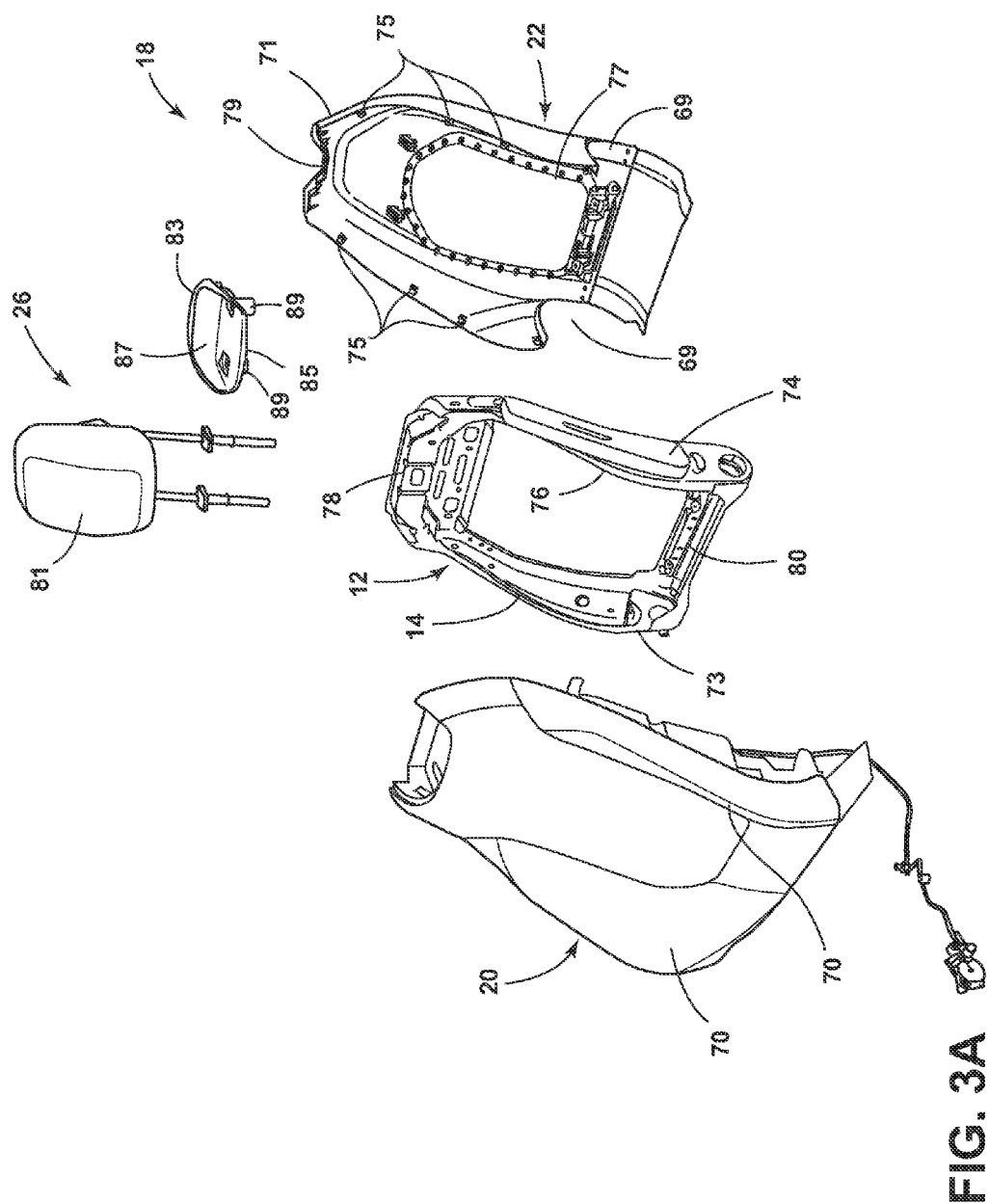
FIG. 3A is a front perspective partially exploded view of the seatback of FIG. 3, illustrating a back cushion module, a hard back module, and a headrest module separated from the underlying frame.

Turning now to FIGS. 3 and 3A, the seatback 53 is operably coupled with the seat base 38 and includes seatback side bolsters 70 that cradle a passenger resting against the seatback 53. The bolsters 70 are formed in the back cushion module 20 and may be partially supported by the hard back module 22. The hard back module 22, as illustrated in FIG. 3, includes a hard back panel 71 having a lower lip 72 that extends below the remainder of the seatback 53 as well as the seat cushion module 24 and which partially wraps around a rear portion of the seat cushion module 24. In addition, the hard back module 22 includes scalloped sections 69 on a lower portion thereof. The scalloped sections 69 are configured to accommodate the recliner mechanism associated with the relative inclination of the seatback 53. The hard back module 22 also includes a plurality of fastener mechanisms 75 disposed about a periphery of the hard back module 22. The fastener mechanisms 75 allow for direct connection of the hard back panel 71 to the back cushion module 20. Consequently, the hard back panel 71 abuts, but does not couple directly with, the seatback frame 14. Also, the hard back module 22 has a centrally-located wall 77 configured as a pocket to provide additional storage to passengers. The wall 77 may be constructed of the same material or different material than the hard back panel 71. A gap 79 is formed at a top portion of the hard back panel 71, and is configured to accommodate the headrest module 26.

As illustrated in FIG. 3A, the back cushion module 20, the headrest module 26, and the hard back module 22, encompass the seatback frame 14 and a side airbag 74, such that the seatback frame 14 is not visible after installation of the back cushion module 20, the headrest module 26, and the hard back module 22. The seatback frame 14 includes an inboard side support 73, an outboard side support 76, and top and bottom cross members 78, 80, respectively. Notably, the headrest module 26 includes a headrest 81 with engagement posts 64 configured to be inserted through a headrest tray 83 and into the top cross member 78 of the seatback frame 14. The headrest tray 83 includes a downwardly tipped front lip 85 and a rear upwardly extending back wall 87. The headrest tray 83 also includes two downwardly extending supports 89 that engage the seatback frame 14 and back cushion module 20. Additionally, the side airbag 74 is disposed on the outboard side support 76 of the seatback frame 14 and configured to deploy between the back cushion module 20 and the hard back module 22.

Figure 4:
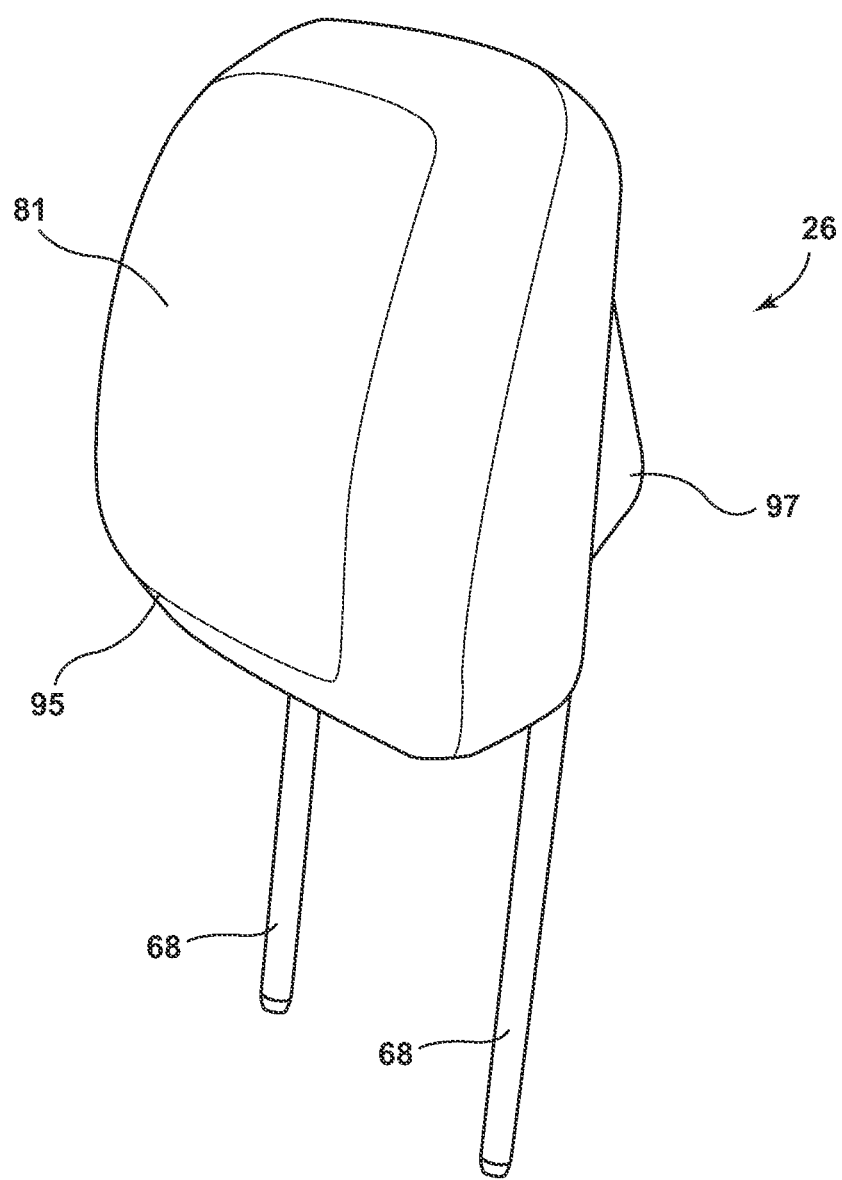
FIG. 4 is a front perspective view of a headrest module of the present disclosure.
Figure 4A:
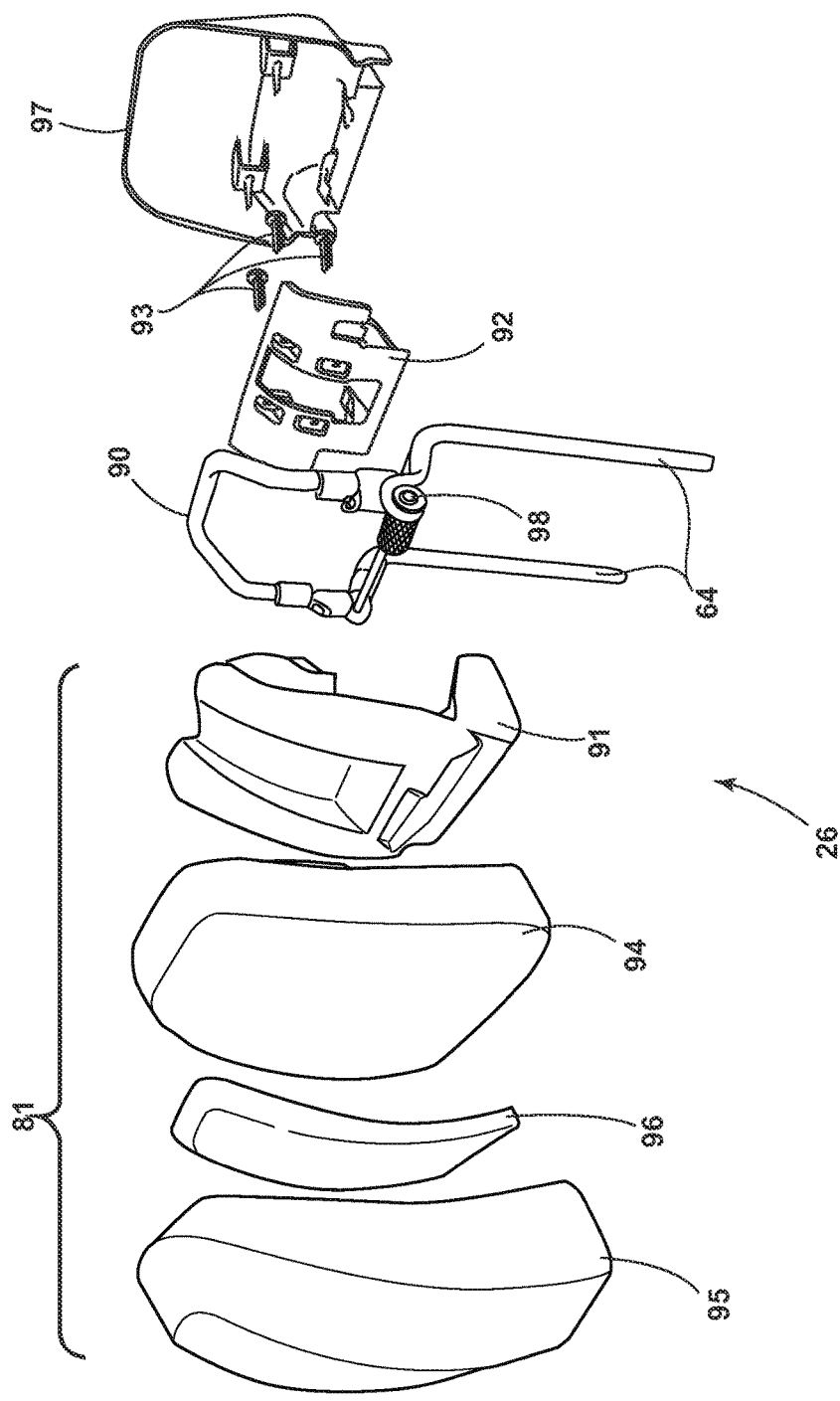
FIG. 4A is a front perspective exploded view of the headrest module of FIG. 4.

Referring now to the illustrated headrest module 26 of FIGS. 4 and 4A, the headrest module 26 includes a frame 90 operably coupled with the engagement posts 64. The frame 90 supports a forward structural member 91 and a rearward structural member 92. The forward structural member 91 and the rearward structural member 92 are connected via mechanical fasteners 93 that extend through the frame 90 of the headrest module 26. The forward structural member 91 supports a headrest cushion 94. A coverstock 95 and a spacer fabric 96 are disposed over the headrest cushion 94 and are in secure engagement with the forward structural member 91 of the headrest module 26. A rear side of the rearward structural member 92 includes a headrest back panel 97 that conceals the structural components of the headrest module 26 from view from passengers sitting behind the vehicle seating assembly 10. The frame 90 of the headrest module 26 includes a latching mechanism 98 to accommodate rotational movement of the frame 90 relative to the engagement posts 64. Accordingly, the relative angle of the frame 90, and consequently the headrest cushion 94, can be adjusted to a desired position to accommodate passengers of different heights and sizes.

Figure 5:
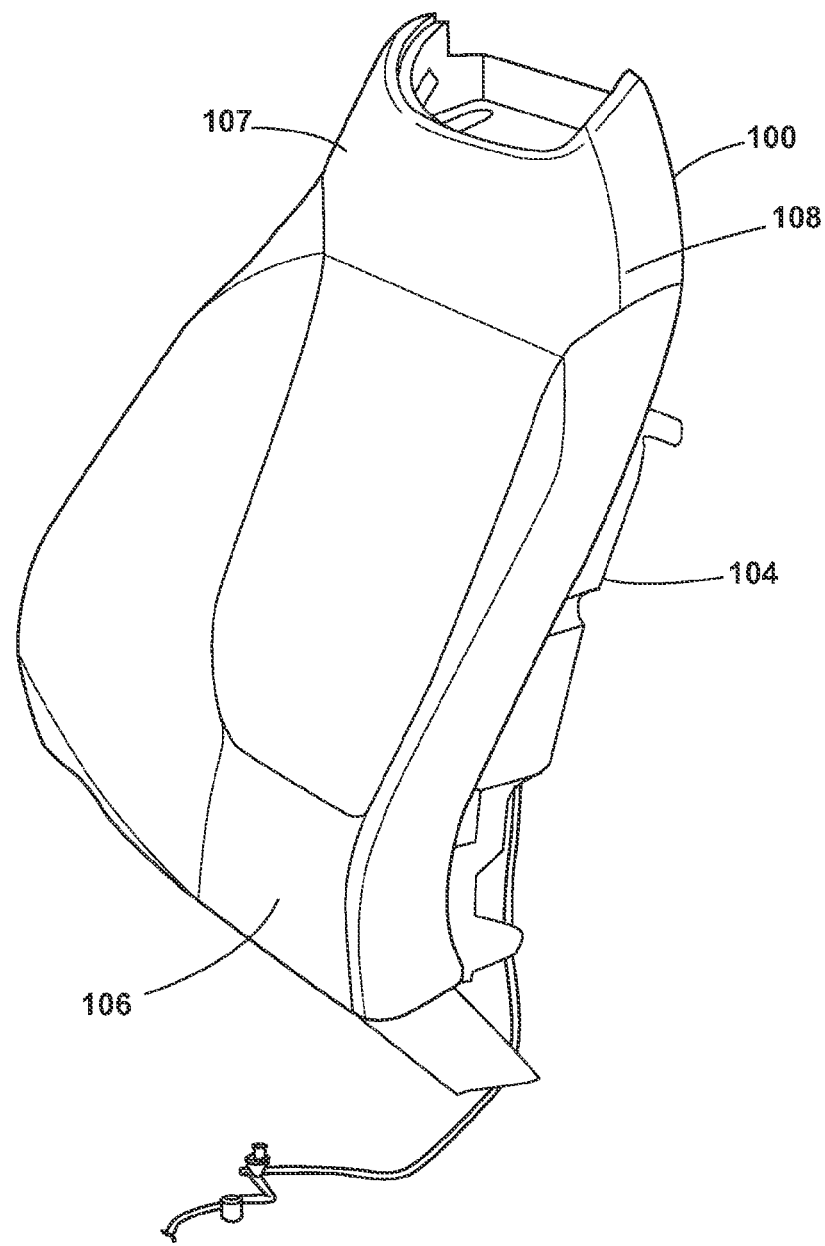
FIG. 5 is a front perspective view of the back cushion module.
Figure 6:
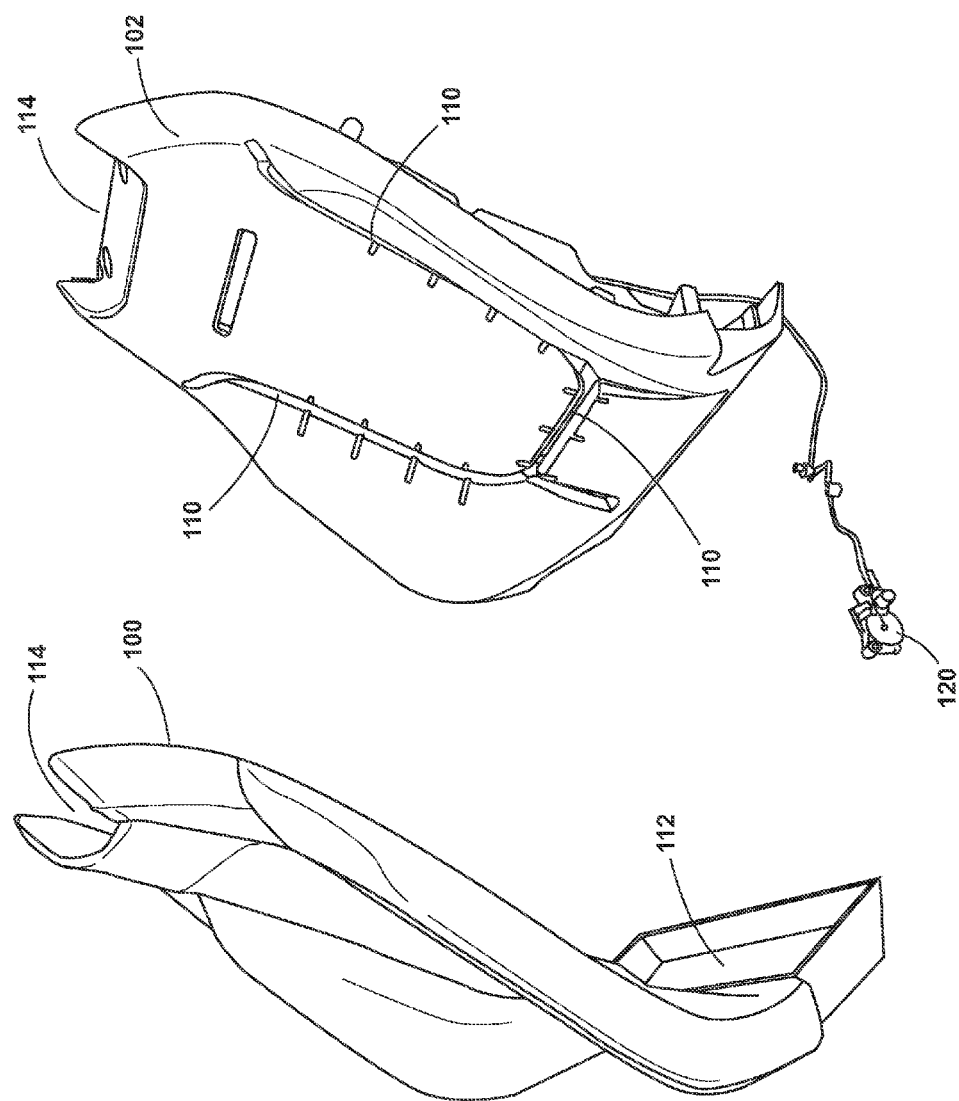
FIG. 6 is a front perspective view of a coverstock removed from a cushion portion of the back cushion module.
Figure 7:
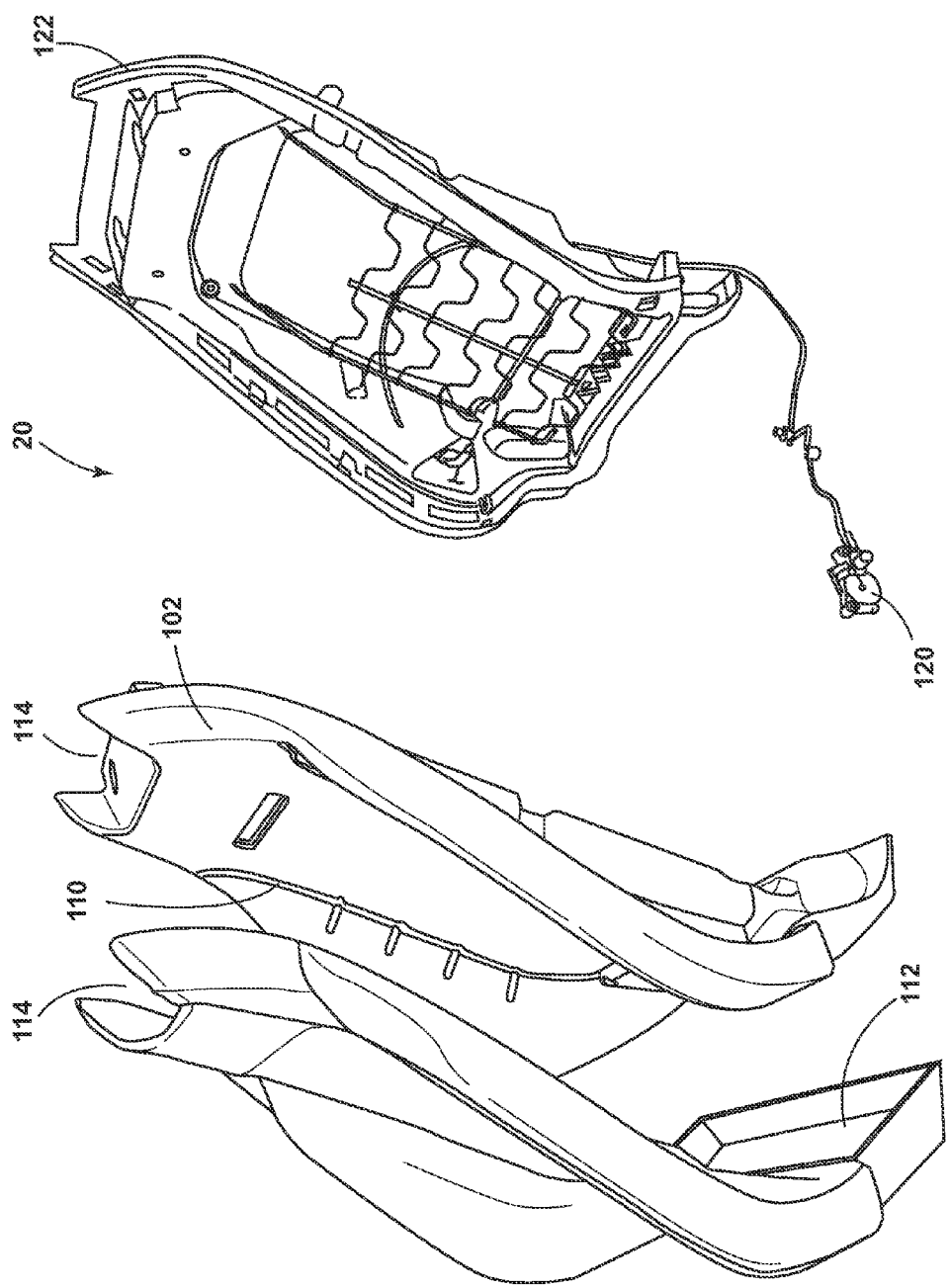
FIG. 7 is a front perspective partially exploded view of the back cushion module of FIG. 5.

With reference to FIGS. 5-7, the back cushion module 20 includes a seatback coverstock 100 that extends over a back cushion 102 of the back cushion module 20. In addition, different varieties of the seatback coverstock 100 may be used to cover the back cushion 102 of the back cushion module 20. In the illustrated embodiment, a first coverstock material 104 is used to cover the bolsters 70 and a lower back 106 of the back cushion module 20. A second coverstock material 107 covers a central and upper back 108. Mechanical fasteners, glue, or other forms of attachment may be used to secure the seatback coverstock 100 with the back cushion module 20.

With reference now to the embodiment generally illustrated in FIG. 6, the back cushion 102 of the back cushion module 20 includes integrally formed trenches 110 configured to receive fasteners disposed on a back surface 112 of the seatback coverstock 100. In addition, an upper portion of both the seatback coverstock 100 and the back cushion 102 includes a recess 114 configured to accommodate the headrest tray 83 and the headrest module 26. Further, a lumbar adjustment assembly 120 (FIG. 7) in the back cushion module 20 is also installed and configured to be adjusted by the lumbar support control 48 disposed on the seat base 38 (FIGS. 1 and 2).

With reference to FIG. 7, the back cushion module 20 includes a back carrier 122 configured to support the lumbar adjustment assembly 120 and also to receive the back cushion 102 and the seatback coverstock 100. It is generally contemplated that the back carrier 122 is constructed from a polymeric material. However, the back carrier 122 could also be constructed from a variety of other materials, including metals or composites.

With reference to FIGS. 8-11, the back carrier 122 is illustrated in more detail. The back carrier 122 includes a plurality of frame attachment features 124 in the form of side tabs 126 and a lower cross member support 127. The side tabs 126 actively engage the inboard side support 73 and the outboard side support 76 of the seatback frame 14 securing the same to the seatback frame 14. The back carrier 122 includes two upper apertures 128 configured to receive engagement posts 64 of the headrest 81. In addition, the back carrier 122 includes an inner flange 144 that provides additional rigidity to the back carrier 122. Fastener apertures 132 are disposed about a periphery of the back carrier 122 and are configured to receive fasteners on one or both of the seatback frame 14 and the back cushion 102. The back carrier 122 generally includes side members 134 that are coupled by a top member 136 and a bottom member 138. The bottom member 138 includes an arcuate support in the form of the lower cross member support 127 that opens rearward, and which wraps about the torsion bar 58 (FIG. 2) of the vehicle seating assembly 10. A support flange 145 extends upward from the arcuate support and includes flange reinforcements 146 extending across the support flange 145.

Figure 10:
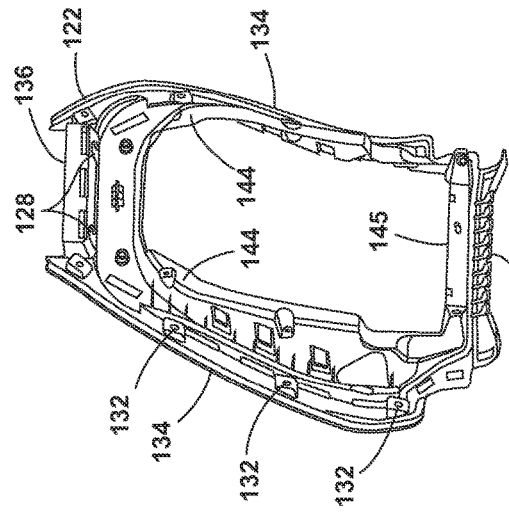
FIG. 10 is a rear perspective view of the composite back carrier of FIG. 8.
Figure 11:
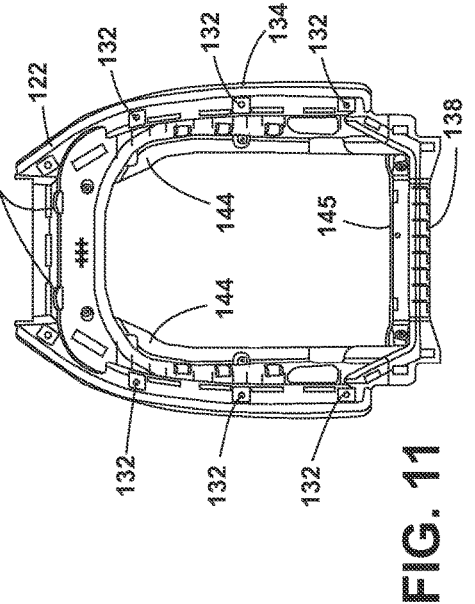
FIG. 11 is a rear elevational view of the composite back carrier of FIG. 8.
Figure 8:
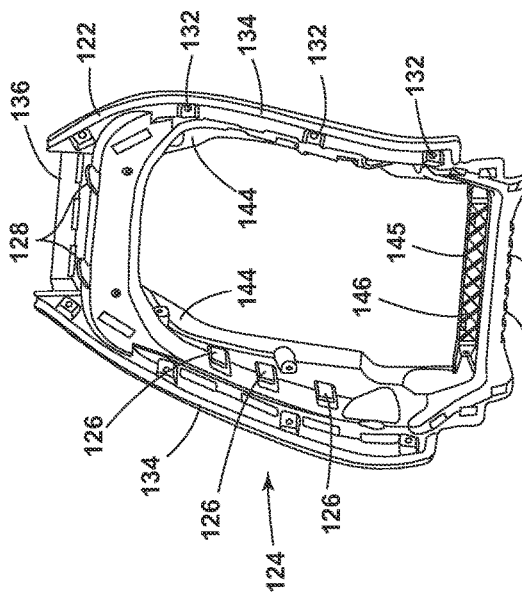
FIG. 8 is a front perspective view of a composite back carrier of the back cushion module.
Figure 9:
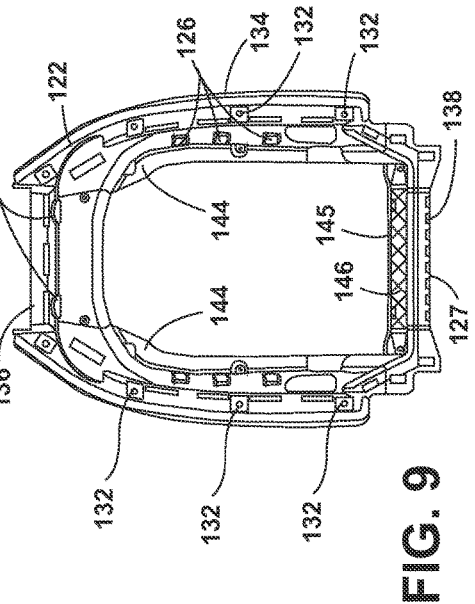
FIG. 9 is a front elevational view of the composite back carrier of FIG. 8.

With reference to FIGS. 10 and 11, the frame attachment features 124 are designed to fit into the inboard side support 73 and the outboard side support 76 to maintain the back carrier 122 in position on the seatback frame 14. At the same time, the top member 136 of the back carrier 122 is aligned with adjacent to the top cross member 78 of the seatback frame 14. Accordingly, the back carrier 122 closely receives the seatback frame 14 such that minimal space is disposed between the back carrier 122 and the seatback frame 14.

Figure 13:
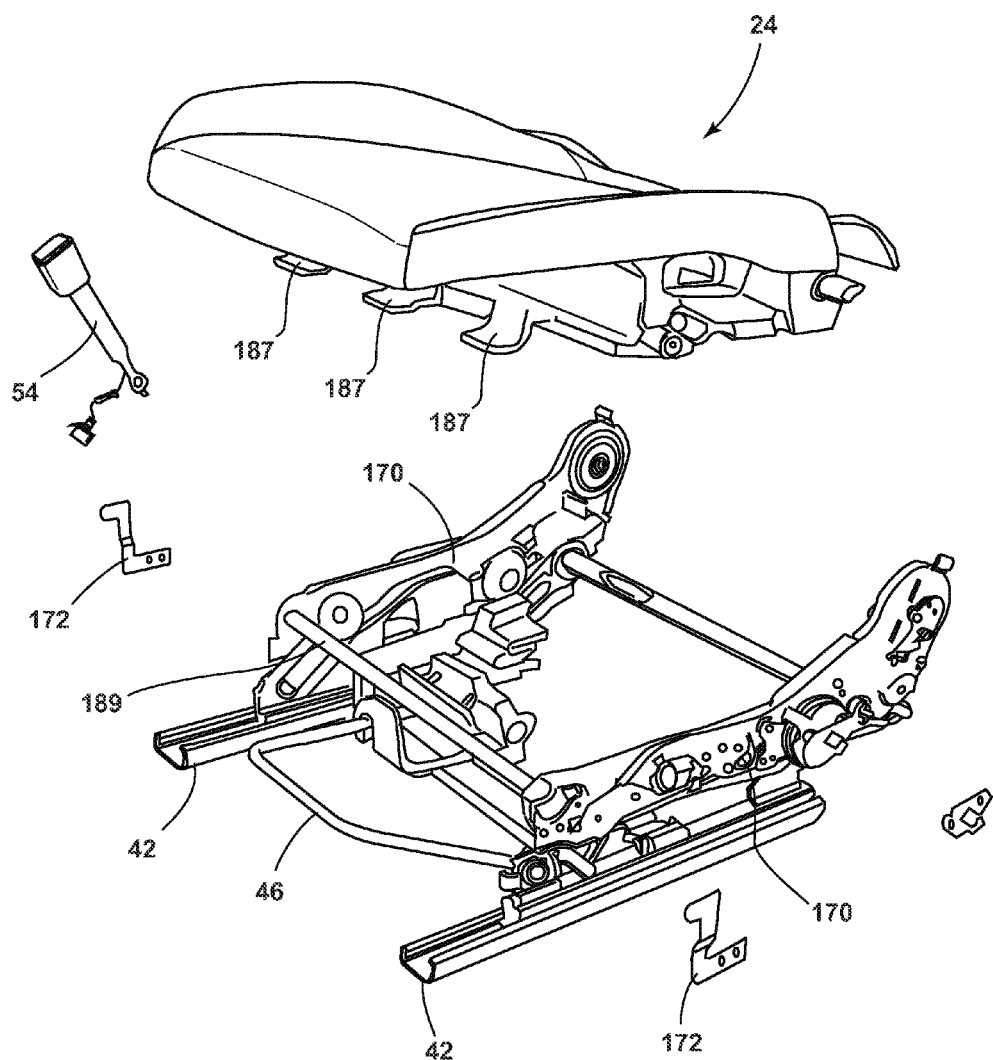
FIG. 13 is a top perspective partially exploded view of the seat cushion module of FIG. 12.
Figure 14:
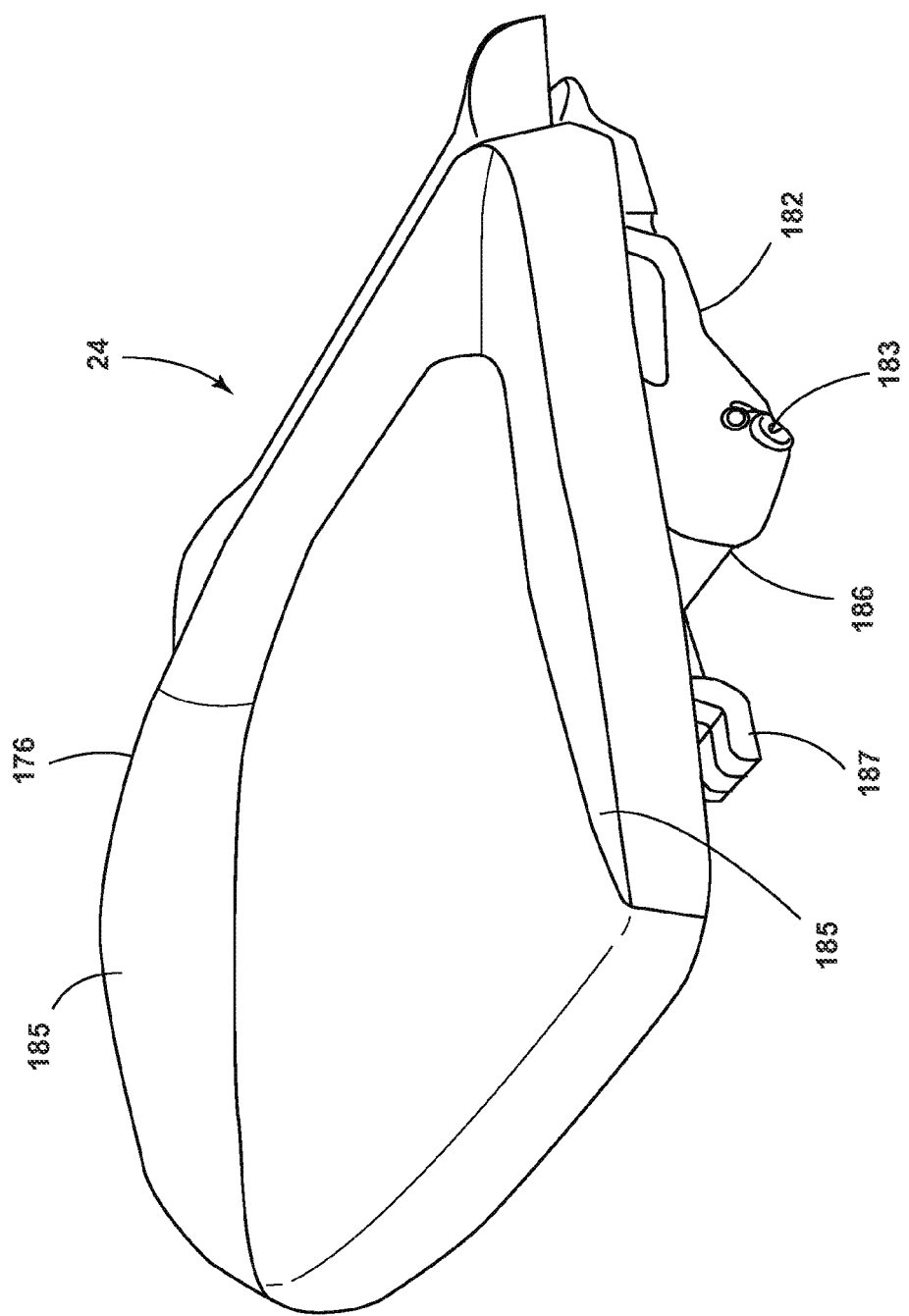
FIG. 14 is a top perspective view of the seat cushion module with the underlying support frame removed.
Figure 15:
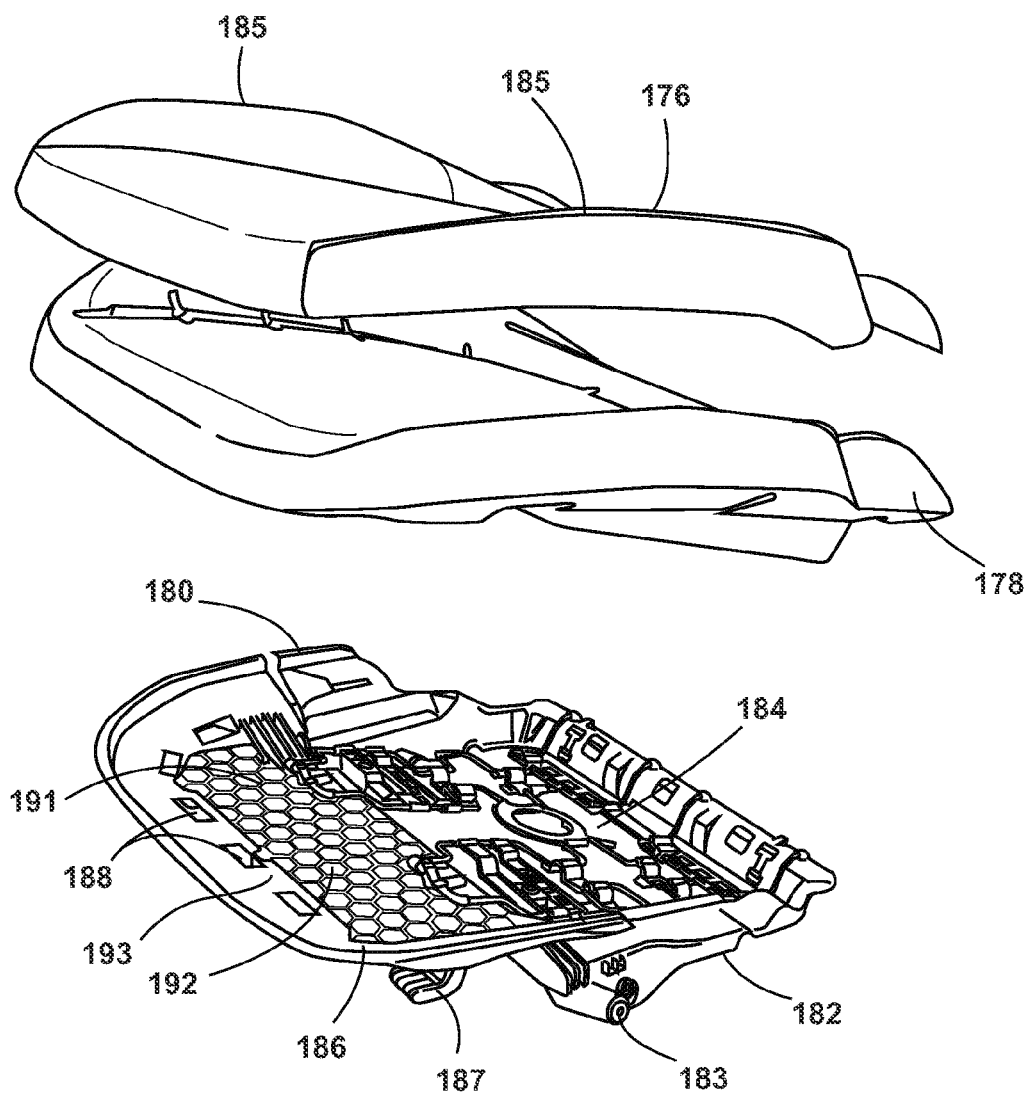
FIG. 15 is a top perspective partially exploded view of the seat cushion module of FIG. 14.
Figure 16:
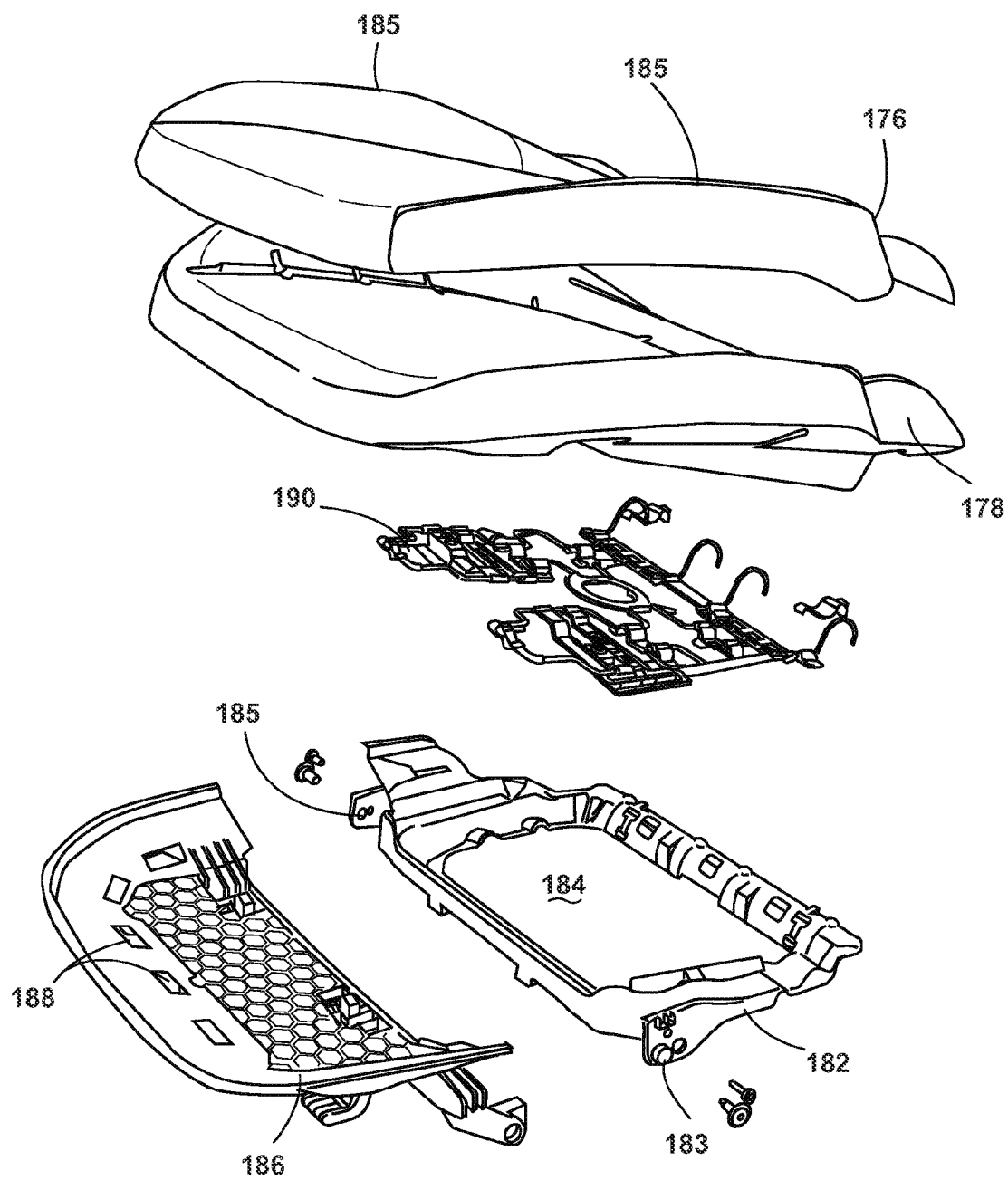
FIG. 16 is another top perspective partially exploded view of the seat cushion module of FIG. 14.

With reference now to FIGS. 12 and 13, the illustrated seat base 38 includes the slides 44 of the seat cushion module 24 supported on the rails 42. Seat side supports 170 support the seat cushion module 24 above the rails 42 and the slides 44. As shown in FIG. 13, the seat cushion module 24 is supported on the seat side supports 170 by connecting brackets 172. In addition, the seatbelt fastener receiver 54 is also disposed adjacent to the seat cushion module 24 and operably coupled with the vehicle.

With reference to FIGS. 13-16, the seat cushion module 24 includes a seat coverstock 176 that extends over a seat cushion 178. Similar to the back cushion module 20, the seat coverstock 176 may include different varieties over different portions of the seat cushion 178. The seat coverstock 176 and the seat cushion 178 are operably coupled with a composite cushion pan 180. The composite cushion pan 180 includes a rearward support 182 defining an intermediate open area 184 and a forward support 186 pivotally coupled to the rearward support 182 at pivot joints 183. The forward support 186 is pivotally coupled to the rearward support 182 to provide adjustability and increased or decreased support to the thighs of a passenger. Side thigh supports 185 also provide thigh support to passengers. The forward support 186 includes arranging upwardly extending flanges 191 in a honeycomb structure 192 across a lower wall 193 of the forward support 186.

With reference again to FIGS. 13-16, the forward support 186 includes hooked tabs 187 that extend below the forward support 186 and forward. The hooked tabs 187 engage an adjustable cross bar 189 that can be raised or lowered to accommodate the legs of different sized passengers. The forward support 186 may be adjusted manually or by a motorized assembly. The forward support 186 is pivotally adjustable up and down relative to the rearward support 182. The forward support 186 includes a plurality of apertures 188 configured to receive mechanical fasteners that wrap the seat coverstock 176 about a forward portion of the seat cushion module 24. In addition, a suspension assembly 190 is disposed in the intermediate open area 184 of the rearward support 182. The suspension assembly 190 supports the seat cushion 178 and the seat coverstock 176, and is configured to withstand both the static and dynamic loads associated with a seated passenger during travel.

Referring again to FIGS. 13-16, the vehicle seating assembly 10 disclosed herein is constructed from the various modules set forth in detail above. It will be understood that the back cushion module 20, the hard back module 22, the seat cushion module 24, and the headrest module 26 are all integrally formed as separate and distinct modules at remote sites. Subsequently, after construction, each of the modules is sent to a manufacturing facility where the modules are installed over the seating frame 12. This construction allows for quick and easy manufacturing and independence of each of the modules. That is, that modules can be swapped in and out of the vehicle seating assembly 10 without having to deconstruct the entire vehicle seating assembly 10. This provides minimized production time, increased savings of production, and an overall better product. Further, additions or changes can be made to separate modules without impacting other modules on the vehicle seating assembly 10.

Vehicle seating assemblies are traditionally assembled piece by piece from the floor up. Complexities of the seating assemblies can be achieved using this technique, but the process is time consuming and costly. In addition, lack of modularity results in costly and time intensive repairs and replacement. A modular system, such as that set forth above provides an ideal way to construct multiple modules at different locations or facilities at different geographic locations, and bring them to a single site for to complete the final vehicle seating assembly. In addition, this system provides an easy method for building a seating assembly. Specifically, only a few parts (each of the modules) are brought together and secured with the seating frame. Accordingly, few fasteners and tools to tighten those fasteners are needed. Moreover, repair or replacement of parts is simplified. If, for example, the seat cushion assembly has a defect or has been damaged, the seat cushion assembly can be removed from the vehicle seating assembly and replaced in just a few minutes.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seatback frame and a seat frame defining a seating frame;
    a plurality of distinct assembly modules configured for attachment with the seating frame, the plurality of distinct assembly modules including:
        a back cushion module;
        a hard back module;
        a headrest module; and
        a seat cushion module including a rear arcuate support that opens downwardly and which engages a torsion bar of the seating frame, and wherein the seat cushion module includes a composite cushion pan comprising:
            a rearward support defining an intermediate open area; and
            a forward support pivotally coupled to the rearward support;
        a suspension assembly disposed in the intermediate open area;
        a cushion extending over the composite cushion pan; and
        a coverstock covering the cushion.

2. The vehicle seating assembly of claim 1, wherein the seat cushion module includes a cushion pan having forward facing hooked tabs that engage a vertically adjustable crossbar.

3. The vehicle seating assembly of claim 2, wherein the cushion pan assembly includes a forward support and a rearward support pivotally coupled to the forward support.

4. The vehicle seating assembly of claim 3, wherein the rearward support defines an intermediate open area through which a suspension assembly extends.

5. The vehicle seating assembly of claim 4, wherein the forward support includes a plurality of peripheral apertures on an underside thereof that are configured to receive mechanical fasteners of a seat coverstock.

6. The vehicle seating assembly of claim 1, wherein the seat cushion module further comprises a cushion pan including a pivotally adjustable forward support, wherein the forward support includes a plurality of upwardly extending flanges extending across the forward support.

7. The vehicle seating assembly of claim 6, wherein the upwardly extending flanges are arranged in a honeycomb structure across a lower wall of the forward support.

8. A vehicle seating assembly comprising:
    a seatback frame encompassed by a plurality of distinct assembly modules including:
        a back cushion module;
        a hard back module;
        a headrest module; and
        a seat cushion module including a composite cushion pan comprising:
            forward facing hooked tabs that engage a vertically adjustable crossbar;
            a rearward support defining an intermediate open area; and
            a forward support pivotally coupled to the rearward support.

9. The vehicle seating assembly of claim 8, wherein the cushion pan assembly includes a forward support and a rearward support pivotally coupled to the forward support.

10. The vehicle seating assembly of claim 9, wherein the rearward support defines an intermediate open area through which a suspension assembly extends.

11. The vehicle seating assembly of claim 10, wherein the forward support includes a plurality of peripheral apertures on an underside thereof that are configured to receive mechanical fasteners of a seat coverstock.

12. The vehicle seating assembly of claim 11, wherein the seat cushion module includes a rear arcuate support that opens downwardly and which engages a torsion bar of the seating frame.

13. The vehicle seating assembly of claim 8, wherein the seat cushion module further comprises a cushion pan including a pivotally adjustable forward support, wherein the forward support includes a plurality of upwardly extending flanges extending across the forward support.

14. A method of making a vehicle seating assembly comprising:
    constructing a seating assembly frame having a seatback frame;
    constructing a plurality of distinct assembly modules including a seat cushion module;
    coupling a composite cushion pan with the seat cushion module;

providing the composite cushion pan with a rearward support defining an intermediate open area; and providing a forward support pivotally coupled to the rearward support, wherein the forward support includes a plurality of upwardly extending flanges extending across the forward support.

15. The method of claim 14, further comprising:

positioning forward facing hooked tabs on the seat cushion module that engage a vertically adjustable crossbar on the seating assembly frame.

16. The method of claim 14, further comprising:

arranging the upwardly extending flanges in a honeycomb structure across a lower wall of the forward support.

17. The vehicle seating assembly of claim 14, further comprising:

constructing each of the distinct assembly modules at different geographic locations.

\* \* \* \* \*